July 9, 1929.  W. WALKER  1,720,499

EDUCATIONAL COMPUTING DEVICE

Filed July 1, 1926   2 Sheets-Sheet 1

Inventor
W. Walker
By Watson E. Coleman
Attorney

July 9, 1929.  W. WALKER  1,720,499
EDUCATIONAL COMPUTING DEVICE
Filed July 1, 1926   2 Sheets-Sheet 2
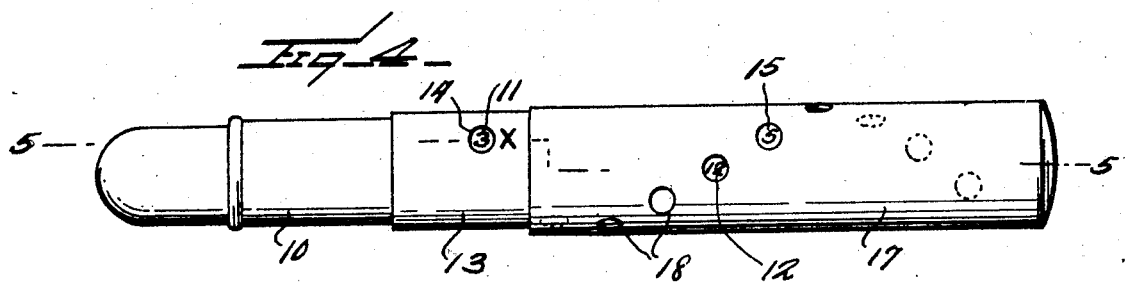
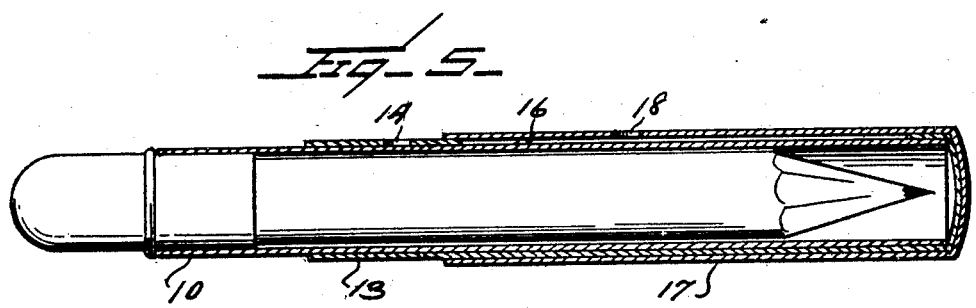
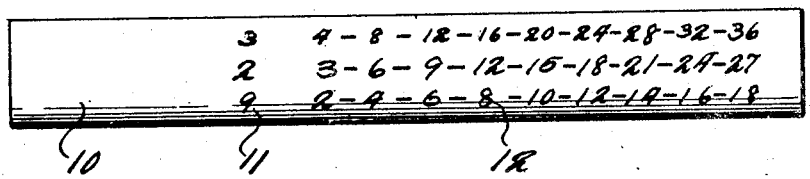
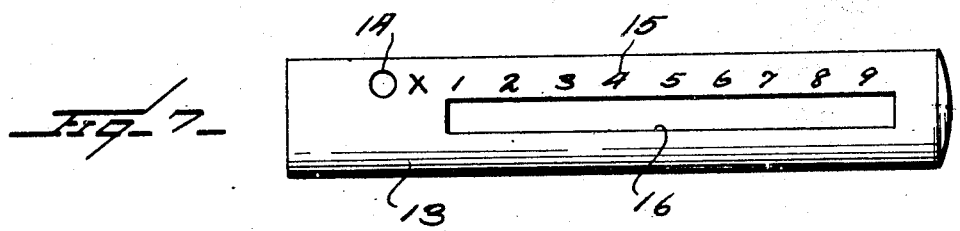
Inventor
W. Walker
By Watson E. Coleman
Attorney Patented July 9, 1929.

1,720,499

UNITED STATES PATENT OFFICE.

WILLIAM WALKER, OF FONDA, IOWA.

EDUCATIONAL COMPUTING DEVICE.

Application filed July 1, 1926. Serial No. 119,940.

This invention relates to educational devices and the general object of the present invention is to provide a device for teaching multiplication or division by providing an aid to children in memorizing and acquiring a ready knowledge of the common multiplication and division tables.

A further object is to provide a device of this character which includes a plurality of cylinders, one rotatable within the other, and adapted to act as a pencil case.

A still further object is to provide a device of this character which is very simple, may be cheaply made, and which is thoroughly effective for the purpose intended.

My invention is illustrated in the accompanying drawings wherein:—

Fig. 4 is a side elevation of another form of my device;

Fig. 5 is a section on the line 5—5 of Figure 4;

Fig. 6 is an elevation of the inner cylinder;

Fig. 7 is an elevation of the intermediate cylinder.

Figure 1:
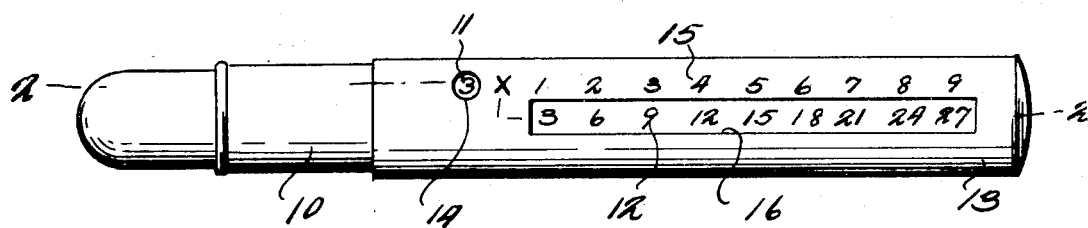
Figure 1 is an elevation of one form of my device.
Figure 2:
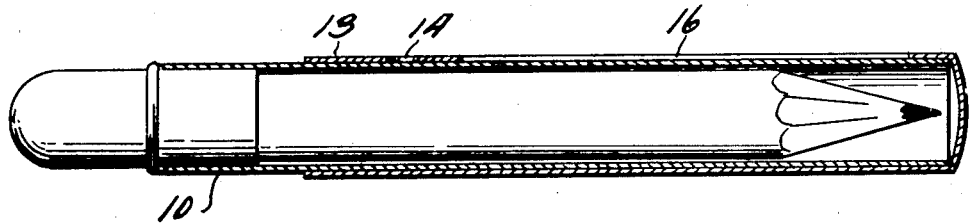
Fig. 2 is a longitudinal sectional view thereof.
Figure 3:
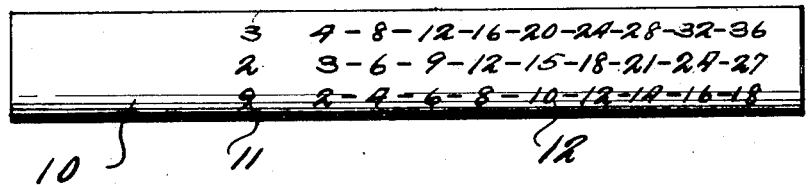
Fig. 3 is an elevation of the inner cylinder.

Referring to that form of the device shown in Figures 1 to 3, it will be seen that it embodies an inner cylinder 10 which is preferably hollow and adapted to be used as a shield over the end of a pencil, this cylinder 10 being provided on its surface with a series of numerals designated 11 arranged in circumferential order as from 2 to 9, these numerals being one of the factors in the arithmetical problem of division or multiplication.

Disposed in alignment with each numeral of the series 11 are a plurality of longitudinal series of numerals 12. The numerals 11 may constitute multipliers in the operation of multiplying and the series of numerals 12 are the totals. Arranged to slide over and be disposed concentric to the cylinder 10 is a cylinder 13 which may be made of any suitable material as, for instance, thin sheet metal, this cylinder being open at one end and closed at the other and being provided adjacent its open end with an opening 14 which, as the cylinder 13 is turned around the axis of the cylinder 10, will register successively with the several numerals 11.

Arranged in alignment with the opening 14 are a series of numerals from 1 to 9, for instance, these series being designated 15, and these numerals constituting the multiplicands and just below the series of numerals 15 the cylinder 13 is longitudinally slotted as at 16, and through this slot any one of the series of numerals 12 may be observed. It will be noted that when the perforation 14 discloses any one of the multipliers 11, the slot 16 will be disposed to disclose the numbers 12 indicating totals which are associated with the multiplier of next lower denomination. Preferably a multiplying symbol, as for instance, the usual "X" is disposed between the perforation 14 and the first number of the series 15.

In the use of this device, assuming that it be desired to multiply any number from 1 to 9 by 3, the outer shell or cylinder 13 is rotated upon the inner shell or cylinder so as to bring the opening 14 over the multiplier 3. There will then appear in the slot 16 one of the series 12 and this will indicate the results obtained by multiplying any one of the numbers 15 by the numeral 3. Thus, will appear for instance, immediately beneath the numeral 4 there in the slot 16 the numeral 12 showing that three times four equals this number and as an example there will appear immediately beneath the numeral 8 the numeral 24, showing that three times eight equals twenty-four. Obviously division may be accomplished in the same manner but reversely. Thus, if the numeral 36 is to be divided by six, the shell 13 is turned until the divisor appears in the perforation 14. The numeral 36 will then appear in the slot 16 and immediately above the numeral 36 will appear, the numeral 6 showing that 6 will go into 36 six times.

In the form of the invention disclosed in Figures 4 to 7, there is also an inner cylinder 10 of thin sheet metal or like material and. adapted to constitute a shield for a pencil or a rubber and this contains the circumferential series of factors designated 11 and the longitudinally extending series of results designated 12.

Surrounding the tubular member 10 is a second cylinder 13 as previously described, having the opening 14 having the longitudinally extending series of multiplicands 15 and having the slot 16 but in addition to this I provide a tubular member 17 which surrounds the member 13 and rotates thereon and which is shorter than the member 13 and provided with a spirally arranged series of openings 18 spaced apart circumferentially the same distance as the longitudinally extending columns 12 are spaced apart. With this construction when it is desired to multiply one factor by another the shell or cylinder 13 is rotated upon the cylinder 10 until the desired multiplier is disclosed through the opening 14. The outer shell 17 is then turned until the desired multiplicand is disclosed through one of the openings 18. If now this outer cylinder be turned one step so as to bring that opening through which the multiplicand has been observed into alignment with the total column shown through the slot 16, the proper total will be disclosed through said opening. Obviously on reverse operation division will be indicated. It is not believed necessary to give any further examples of the operation of either multiplying or dividing by means of this instrument as its operation will be obvious.

While this device is designed for educational purposes and is particularly adapted to making children familiar with the tables of multiplication and division, yet it is obvious that it might be used as a simple computing device.

This device is very simple, can be cheaply made, constitutes a convenient pencil holder and protector, and is, therefore, particularly suitable for schools, and at the same time provides a ready means of familiarizing children and others with the multiplication table and with the operation of dividing.

I do not wish to be limited to any specific construction nor to the particular embodiment of my invention as this principle might be embodied in other forms. It will be noted that in both forms of my device I have provided two members one having thereon the multiplier and the other the multiplicand, one having thereon the result of the multiplication and the other having thereon an opening through which said result may be seen when the parts are properly adjusted and also carrying thereon the multiplicand.

I claim:—

1. An educational device of the character described comprising a tubular member having thereon a series of multipliers arranged in circumferential series and having a plurality of longitudinal series of result numerals, one for each multiplier, each disposed longitudinally in line with a multiplier of the next higher or lower denomination, and an outer rotatable member mounted on the inner member and having an aperture through which any one multiplier may be observed, and having in alignment with said aperture a series of multiplicands, said last named rotatable member having an opening so disposed as to disclose the result figures correlated with the multiplier being used and disclosed through the opening.

2. An educational device of the character described comprising a cylinder having thereon a series of multipliers arranged in circumferential order and a longitudinal series of result numerals, one for each multiplier, each disposed longitudinally in line with a multiplier of the next higher or lower denomination, and an outer cylinder disposed over the inner cylinder and rotatable around the same axis and having an aperture through which any one multiplier may be observed and having in alignment with said aperture a longitudinal series of multiplicands, said second named cylinder having a longitudinal slot disposed in offset relation to the aperture and extending parallel to the series of multiplicands to thereby disclose the result numerals correlated with the multiplier being used and disclosed through said aperture.

3. An educational device of the character described comprising a cylinder having thereon a series of multipliers arranged in circumferential order and a longitudinal series of result numerals, one for each multiplier, each disposed longitudinally in line with a multiplier of the next higher or lower denomination, and an outer cylinder disposed over the inner cylinder and rotatable around the same axis and having an aperture through which any multiplier may be observed and having in alignment with said aperture a longitudinal series of multiplicands, said second named cylinder having a slot disposed in offset relation to the aperture and parallel to the series of multiplicands to thereby disclose the result numerals correlated with the multiplier being used and disclosed through said aperture, and an exterior cylinder having a diagonally arranged series of openings disposed in a spiral line around the series and equal in number to the multipliers and through which successive multiplicands may be observed as the cylinder is rotated in a clock-wise direction and through which the result of any multiplication operation may be observed by turning the cylinder one step in a counter-clockwise direction.

In testimony whereof I hereunto affix my signature.

WILLIAM WALKER.